Sept. 2, 1969     L. D. McCABE     3,464,131
COMBINATION SPREADER-FEEDER FOR FLATWORK IRONER
Filed April 21, 1966     4 Sheets-Sheet 3
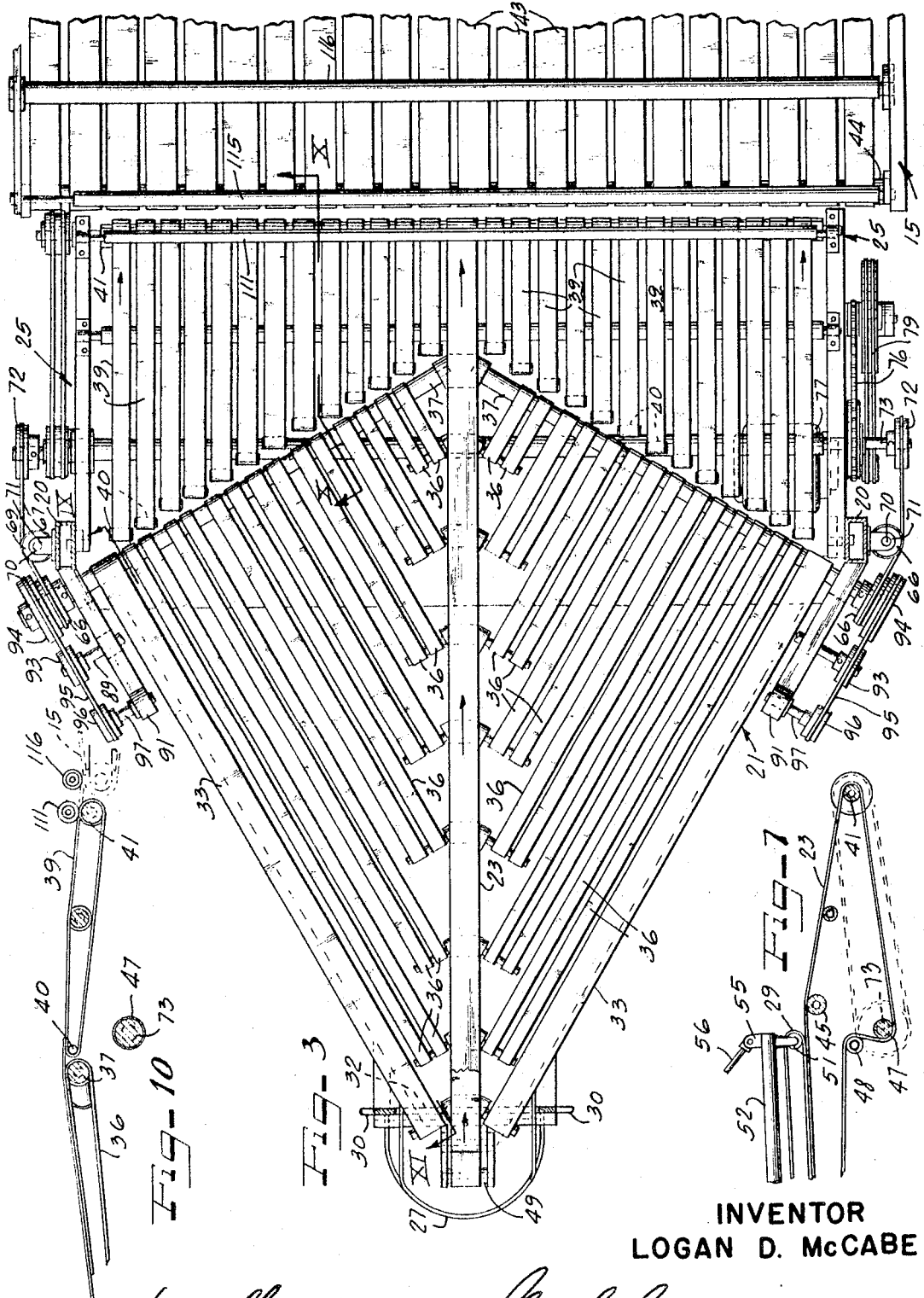
INVENTOR
LOGAN D. McCABE
BY     ATTORNEYS

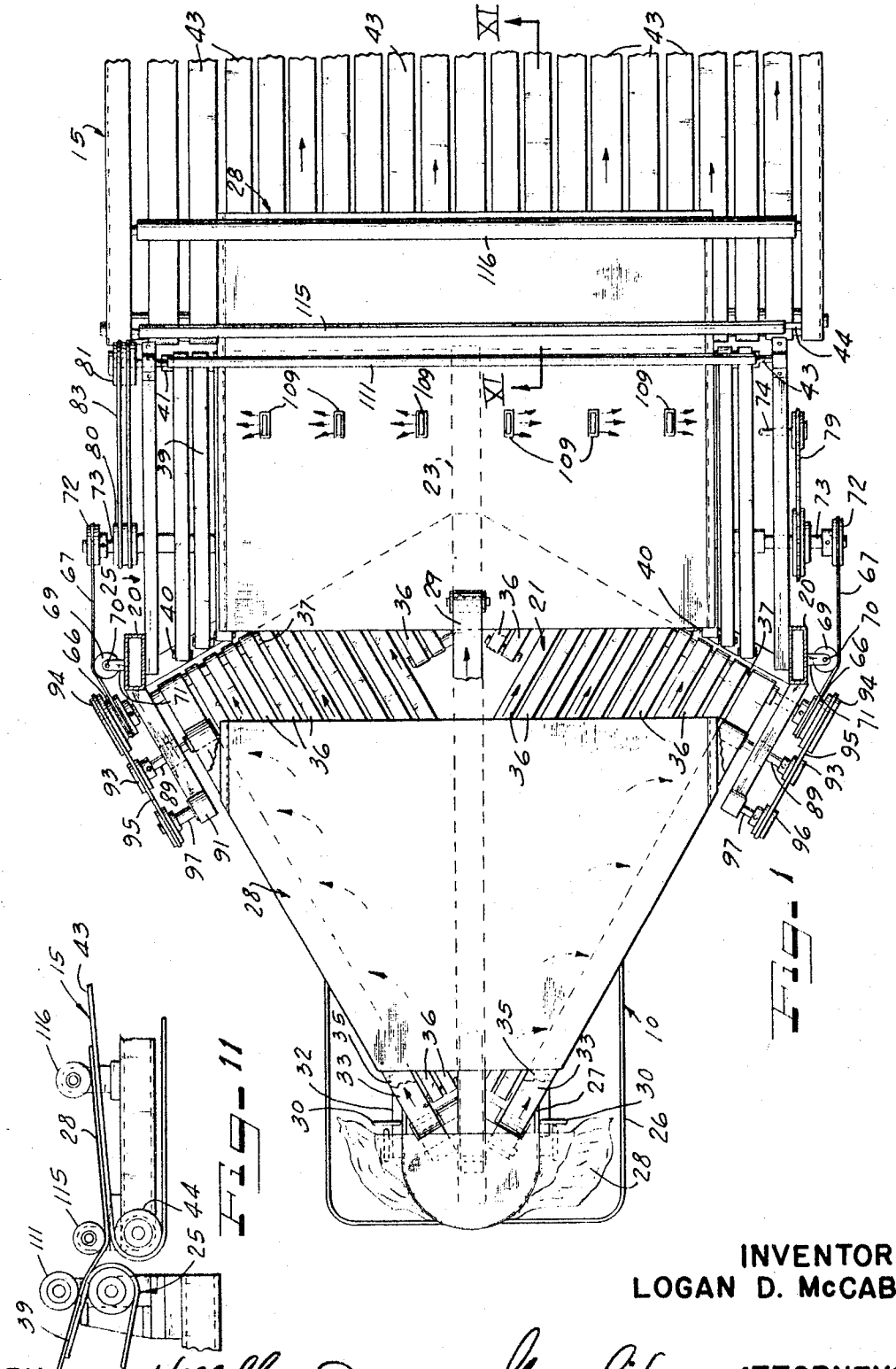

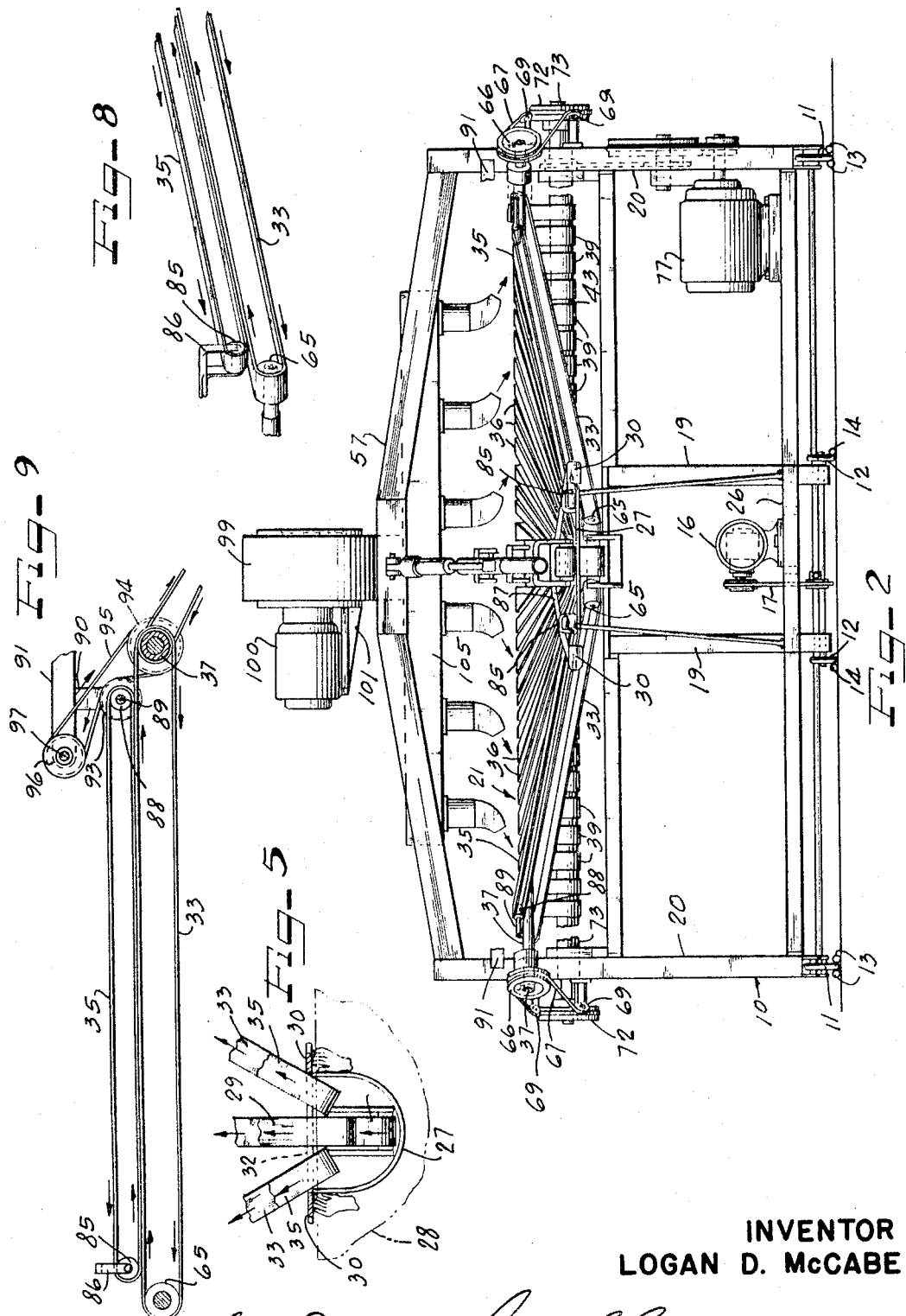

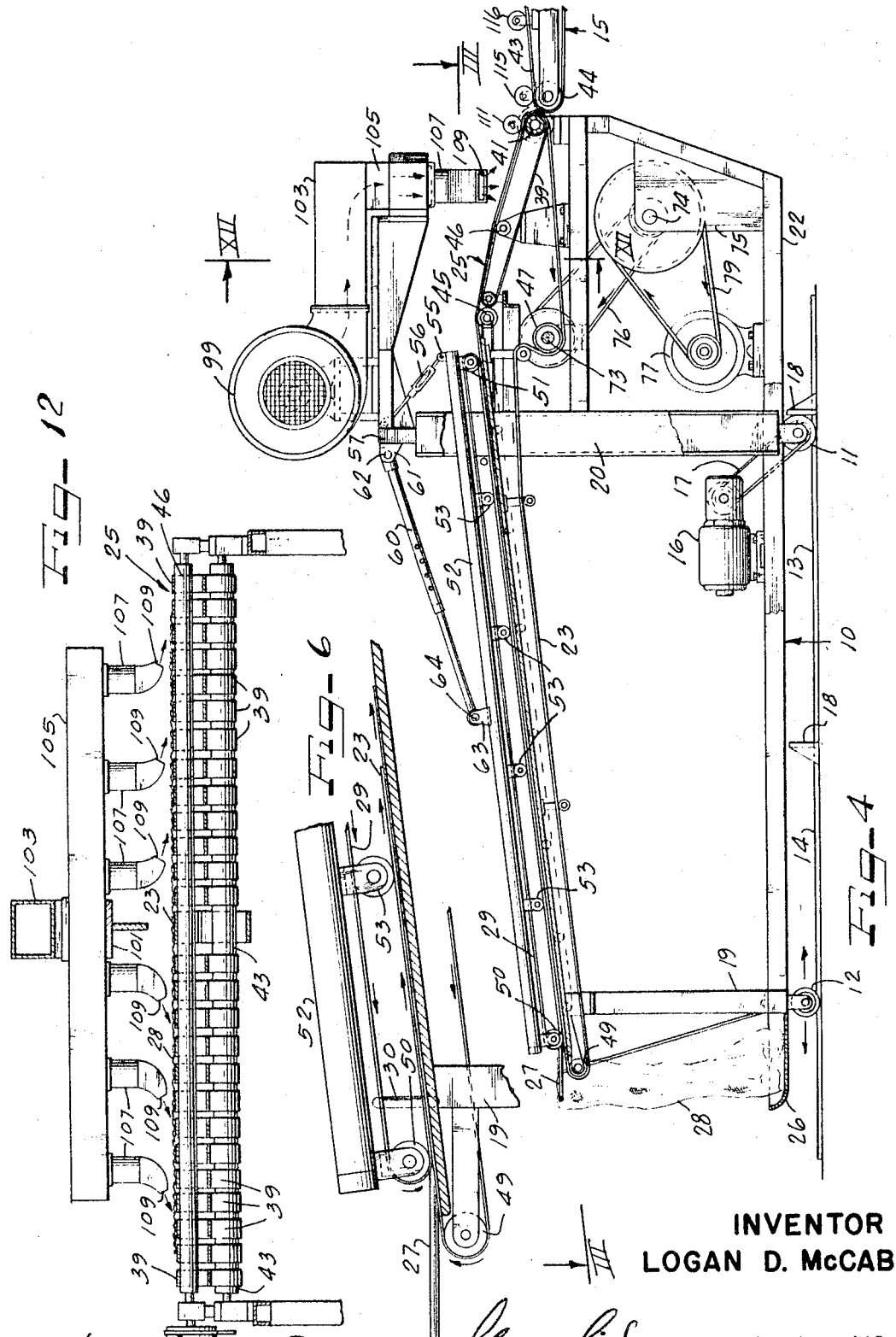

United States Patent Office 3,464,131
Patented Sept. 2, 1969

3,464,131
COMBINATION SPREADER-FEEDER FOR FLAT WORK IRONER
Logan D. McCabe, Lubbock, Tex., assignor to G. A. Braun, Syracuse, N.Y., a corporation of New York
Filed Apr. 21, 1966, Ser. No. 544,137
Int. Cl. D06f 67/04
U.S. Cl. 38—143                                           19 Claims

ABSTRACT OF THE DISCLOSURE

Apparatus for spreading flatwork prior to ironing and supplying the flatwork to an ironer in a centered and squared condition. A longitudinal conveyor belt and a vertically spaced aligned gripper belt extend along the center of the apparatus and draw the flatwork over a prespreader bar at the front of the apparatus. Parallel spreader belts are spaced along opposite sides of the conveyor belt and extend at oblique angles with respect to the conveyor belt and are flared outwardly from the conveyor belt as they extend therealong. Parallel oblique tensioning belts extend along the outer sides of the outermost spreader belts. Cooperating aligned endless tensioning belts are spaced above the oblique tensioning belts and are driven at a higher rate of speed than the speed of travel of the tensioning belts. The laundered article is delivered by the spreader belts to a series of parallel conveyor belts driven at a higher rate of speed than the speed of the spreader belts. Jets of air are impinged on the article outwardly of the center of the article toward the edges thereof as it leaves the spreader belts and is conveyed to an ironing machine conveyor by the downwardly inclined conveyor belts.

---

In ironing flatwork, such as sheets, tablecloths, bed spreads and other articles by power operated ironers, as the articles come from the extractors or shake out tumblers for ironing, usually four operators and many times as many as seven operators are required for each ironer to hold, center, spread and feed each article to the ironer, and even then unless the articles are fed to the ironer with care and skill, the articles are not always centered, squared and spread sufficiently to free them from wrinkles, with the result that the ironer frequently irons wrinkles in the articles.

While separate spreaders and feeders have been used to spread and supply flatwork to ironers, since the apparatus have been separate, operators are usually required for each apparatus, to center and square the flatwork, both at the spreader and the feeder, with the result that the requirement for manual help to supply flatwork to the ironer has not been reduced to any great extent.

Summary and objects of the invention

A principal object of the present invention, therefore, is to remedy the foregoing disadvantages in power ironing of flatwork by providing a simple and improved form of spreader and feeder for flatwork, automatically spreading and supplying the flatwork in wrinkle free centered and squared condition for power ironing.

Another object of the invention is to improve upon the devices heretofore used for supplying flatwork to power ironers by providing a simple and improved form of power operated spreader and feeder so arranged as to spread and stretch the flatwork for supply to the ironing machine and to feed the flatwork to the ironing machine in a centered squared condition.

A still further object of the invention is to provide an improved form of apparatus for spreading and feeding flatwork to power ironing machines, grasping the flatwork at its center and stretching the flatwork outwardly in opposite directions from its center and thereby performing a wrinkle removing and centering and squaring operation on the flat work, as conveyed to a flat work ironer.

A still further object of the invention is to provide a simple and improved apparatus for supplying flatwork to power ironers, arranged with a view towards operation by a single operator, and spreading the flatwok by gripping and feeding the flatwork along its center and stretching the flatwork outwardly in opposite directions from its center.

Still another object of the invention is to provide a feeding apparatus for flatwork and the like in which the flatwork is gripped along its center in the pressure nip between two vertically spaced feeder conveyors and is stretched outwardly of its center between vertically spaced tensioning conveyors diverging from opposite sides of the feeder conveyors, in which the upper of the tensioning conveyors travel at a faster speed than the lower supporting conveyor, to tension the flatwork as drawn therealong.

Still another object of the present invention is to provide a spreader and feeder for flatwork and the like, operating on the principle of a central gripping conveyor and oblique spreading and tensioning conveyors extending laterally from opposite sides of the central gripping conveyor, in which air streams are directed on the flatwork as discharged from the oblique conveyors, to force the flatwork outwardly of its center and remove wrinkles therefrom, as well as to straighten any uneven edges of the flatwork, as supplied to the laundry machine.

A still further object of the invention is to provide a spreader and feeder for flatwork and the like, having a central gripping conveyor in the form of a power driven supporting conveyor and a free top conveyor engaging the supporting conveyor under pressure and cooperating therewith to provide a gripping pressure nip for the flatwork, conveying the flatwork along a series of diverging conveyors, diverging from opposite sides of the gripping conveyor, in which a simple and improved form of prespreading guide is provided at the receiving end of the gripping conveyor, enabling the operator to supply an article of flatwork to the gripping conveyor along the center thereof and initially spreading the flatwork as drawn onto and along the diverging conveyors.

Still another object of this invention is to spread flatwork preparatory to ironing.

Still further objects are to achieve the above with a device that is sturdy, compact, durable, simple, safe, versatile, and reliable, yet inexpensive and easy to manufacture, install, operate, and maintain.

Still further objects are to achieve the above with a method that is rapid and inexpensive and does not require skilled people to install, adjust, operate, and maintain.

These and other objects of the invention will appear from time to time as the following specification proceeds and with reference to the accompanying drawings wherein:

FIGURE 1 is a top plan vew of a flatwork feeder and spreader constructed in accordance with the principles of the present invention, with certain parts broken away and certain other parts shown in horizontal section, and showing spaced articles of flatwork on the spreader and feeder in the operation of being spread and supplied to the ironing machine conveyor;

FIGURE 2 is an end view of the machine shown in FIGURE 1 looking at the machine toward the front end thereof:

FIGURE 3 is an enlarged plan view of the machine with certain parts removed and certain other parts in horizontal section in order to show certain details of construction of the machine, FIGURE 4 is a view in side elevation of the machine shown in FIGURE 1 with certain parts broken away and certain other parts shown in longitudinal section;

FIGURE 5 is a fragmentary plan view of the receiving end of the machine, illustrating the hand stops limiting movement of the hands of the operator as feeding a piece of flatwork to the machine;

FIGURE 6 is a partial fragmentary detail longitudinal sectional view showing certain details of the center gripper and feeder conveyor, at the receiving end thereof;

FIGURE 7 is a partial fragmentary detail longitudinal sectional view illustrating certain details of the feeder and gripper conveyor at the discharge end thereof;

FIGURE 8 is a fragmentary generally perspective view of one of the spaced bottom and top tensioning conveyors;

FIGURE 9 is a partial fragmentary generally longitudinal sectional view taken substantially along line IX—IX of FIGURE 3, and showing certain details of the bottom and top tensioning conveyor not shown in FIGURE 8;

FIGURE 10 is a partial fragmentary generally longitudinal sectional view taken substantially along line X—X of FIGURE 4;

FIGURE 11 is a partial enlarged fragmentary transverse sectional view taken substantially along line XI—XI of FIGURE 1; and FIGURE 12 is a transverse sectional view taken through the discharge conveyor along line XII—XII of FIGURE 4.

In the embodiment of the invention generally illustrated in FIGURES 1, 2, 3 and 4 of the drawings, I have shown a spreader feeder for flatwork such as sheets, bed spreads, table linen and other articles of flatwork, comprising a main frame structure 10 supported on widely motor driven wheels 11, 11 at the delivery end of the frame and closer spaced idler wheels 12, 12 at the receiving end of the frame. The wheels 11, 11 and 12, 12 are respectively guided along tracks 13 and 14 and serve to support and move the machine in a rectilinear path toward and from an ironer conveyor 15, conveying the spread, squared and centered articles of flatwork relatively free of wrinkles, for ironing in the conventional form of ironing machine (not shown).

As shown in FIGURES 2 and 4 a motor 16, which may be a conventional form of electric reversible speed reducer motor, is provided to drive the supporting wheels 11, 11 through a suitable drive means, herein shown for illustrative purposes as being a V-belt drive 17. Stops 18, 18 are spaced along the track 13 to limit extensible and retractible movement of the apparatus with respect to the ironing machine.

The main frame structure 10 also includes parallel spaced upright support standards 19, adjacent the receiving end of the machine, upright standards 20 spaced toward the discharge end of the machine and adjacent the rear end portion of a spreader 21 diverging from the receiving to the discharge end thereof. The main frame also includes an outboard support structure 22, forming a frame structure supporting a drive mechanism for a feeder conveyor belt 23 feeding articles of flatwork along the spreader 21, to effect spreading of the flatwork and the removal of wrinkles therefrom. The outboard support structure 22 extending outwardly of the wheels 11, 11 also forms a support for a delivery conveyor 25 inclined downwardly parallel to the delivery end of the lower feeder conveyor belt 23. The standards 19 and 20 and the outboard support 22 are suitably connected together to form a rigid support structure.

The frame also includes a tray 26 at the receiving end of the machine, for laundered articles, and a pre-spreader bar 27 spaced thereabove and extending about the receiving end of the feeder conveyor belt and a gripper conveyor belt 29, resting on the top of the conveyor belt 23 and driven therefrom, by the frictional contact with the conveyor belt 23.

The pre-spreader bar 27 is of a generally U-shaped form, centered with respect to the feeder conveyor belt 23, with the legs of the the U extending along opposite sides of said feeder conveyor and suitably supported at their inner ends on the frame structure 10. Hand stops 30, 30 are spaced outwardly of the pre-spreader bar 27 and inwardly of the receiving end of the feeder conveyor 21 to limit movement of the hands inwardly along the feeder conveyor belt 23, as an article 'of flatwork 28 is grasped and moved upwardly along the pre-spreader bar 27 and inwardly to the nip between the feeder conveyor belt 23 and the gripper conveyor belt 29. The hand stops 30, 30 are shown in FIGURES 1 and 5 as being suitably mounted on a cross frame member 32, secured to the legs of the U of the pre-spreader rail 27.

The operator of the machine may thus grasp a piece of laundered flatwork 28, such as a sheet, in the tray 26 on opposite sides of the center of the flatwork and raise the flatwork upwardly along the pre-spreader bar 27 and insert the flatwork in the nip between the feeder conveyor belt 23 and the gripper conveyor belt 29, at approximately the center of the article, and guide the article along the conveyor until the hands engage the hand stops 30, 30. The feeder conveyor belt 23 and gripper conveyor belt 29 will thus draw the piece of flatwork 28 along the spreader bar 27 and initially spread the article as drawn along the spreader.

The spreader 21 generally includes two oblique tensioning belts 33, extending from positions adjacent the receiving end of the feeder conveyor belt 23 at equal angles with respect to said feeder conveyor, and diverging from said feeder conveyor belt as they extend therealong. The tensioning belts 33 are driven at a higher rate of speed than the speed of travel of the feeder conveyor belt 23 and each have a hold down belt 35 disposed thereabove and extending therealong, as will hereinafter more clearly appear as this specification proceeds.

The spreader 21 also includes a plurality of spaced endless conveyor belts 36 extending obliquely with respect to the feeder conveyor belt 23 on opposite sides thereof and parallel to the outer tensioning belts 33. The belts 36 on each side of the feeder conveyor belt 23 turn about a drive roller 37 at their discharge ends, which also forms a drive roller for the associated tensioning belt 33.

The delivery conveyor includes a plurality of declining endless belts 39 extending from the endless conveyor belts 36 parallel to the feeder conveyor belt 23 and turning about individual idlers 40 at their receiving ends, and about a common drive roller 41 at their discharge ends.

The belts 39 decline from the belts 36 at the angle of the declining discharge end portion of the feeder conveyor belt 23, as shown in FIGURES 7, 10 and 11.

The ironer conveyor 15 is inclined upwardly at a slight angle with respect to the delivery conveyor 25 and is shown as including a plurality of parallel spaced endless conveyor belts 43 turning about a direction changing roller 44 at their receiving ends to deliver a straightened squared article of flatwork in centered relation with respect to the ironer, for ironing in a conventional manner.

Referring now in particular to certain details of construction of the apparatus, the feeder conveyor belt 23 is trained along the frame 10 from a position disposed forwardly of the spreader rail 27 in an upwardly inclined direction for the full length of the spreader 21. The feeder conveyor belt 23 then turns about a direction changing idler 45 and is inclined downwardly over a spaced idler 46 and about the drive roller 41, about which it changes its direction of travel. From thence the belt travels to the receiving end of the machine under a drive roller 47 and upwardly therefrom and over an idler 48 and forwardly therefrom to and about an idler 49 at its receiving end.

The top gripper conveyor belt 29 is trained about spaced idlers 50 and 51 depending from a beam 52 and in vertically spaced relation with respect to the feeder belt 23. The belt is also trained over and under spaced idlers 53 supported in depending relation with respect to the beam 52 and extending between the upper and lower runs of the belt 29. The beam 52 has a yoke 55 extending vertically of its rear end, having one end of a turnbuckle 56 pivotally connected thereto. The opposite end of the turnbuckle 56 is pivoted to a transverse beam structure 57 extending across the tops of the standards 20, 20 and inclined upwardly of said standards toward the central portion of the apparatus. The beam structure 57 forms a pivotal mounting for the turnbuckle 56 at the center and rear side of the beam.

A stiff arm 60 of adjustable length is pivoted between spaced connector bracket 61 extending to the front face of the beam 57 on a transverse pivot pin 62. The stiff arm includes a sleeve telescoped over a rod. A pin extends through one of a plurality of holes in the sleeve and rod so as to adjust the length of the arm 60. The outboard end of the rod is pivotally connected between spaced ear 63 extending upward of the beam 52, intermediate the ends thereof on a transverse pivot pin 64 (FIG. 4). Thus, it may be seen that the belt 29 is mounted to float upon the belt 23 and is pressed downward by the weight of the beam 52. The support of the beam 52 stabilizes the beam and maintains it in correct position.

The gripper belt 29 is free to travel about the direction changing idlers 50 and 51 and along the spaced idlers 53, 53. The gripper belt 29 thereby cooperates with said feeder conveyor belt to form a gripper pressure nip gripping an article of flatwork along its center and holding it from lateral movement as spread laterally and conveyed upwardly along the conveyor belt 23, for delivery onto the delivery conveyor 25. The turnbuckle 56 may adjust the rear end of the beam 52 and gripper belt 29 with respect to the feeder belt 23, and thereby relieve or increase the gripping pressure at the discharge end of the feeder conveyor belt 23.

The tensioning belts 33 are each trained at their receiving ends about idlers 65, suitably supported at the front or receiving end of the frame structure 10 (FIGURES 2, 3 and 9) and diverge from opposite sides of the feeder belt at equal angles with respect thereto and are inclined upwardly at the general angle of inclination of the feeder belt 23. The tensioning belts 33 turn about and are driven from the drive rolls 37, which also drive the spreader belts 36.

The top tensioning or hold down belts 35, extending above and along the lower belts 33, each turn about a direction changing idler 85 at the receiving end of the machine. The idler 85 is supported on a yoke 86, depending from a support bracket 87, extending diagonally outwardly of the beam 52 at right angles with respect to the direction of travel of the tensioning belts. The belt 35 turns about and is driven from a drive roller 88 keyed or otherwise secured to a drive shaft 89, extending outwardly from said roller and journalled intermediate its ends in a bearing hanger 90. The bearing hanger 90 is suspended from a beam 91, extending from the standard 20, in a direction parallel to the line of travel of the belts 33 and 35, and is disposed thereabove. A drive pulley 93 is keyed or otherwise secured to the outer end of the shaft 89. The drive pulley 93 is driven from a pulley 94 keyed or otherwise secured to the outer end of the drive roller 37, and driving said pulley 93 through a belt 95. The belt 95 is partially wrapped about the upper end portion of the pulley 93, to drive said pulley, by a direction changing idler 96, about which the belt 95 changes its direction of travel. The direction changing idler 96 is suitably journalled on a shaft 97 mounted on the outer end of the beam 91 and extending outwardly therefrom. The drives to the belts 35 are thus step up drives, driving said belts at higher rates of speed than the belts 33 and cooperating therewith to spread and tension the articles of flatwork 28 as drawn upwardly and along its center by the feeder and gripper belts 23 and 29.

The drive to each drive roll 37 and pulley 94, is the same on each side of the machine, so that drive on one side of the machine only need herein be described in detail. A drive pulley 66 is keyed or otherwise secured to the outer end of the drive roll 37, inwardly of the pulley 94. Said pulley 66 is driven from an endless belt 67, which may be a V-belt. As shown in FIGURES 1 and 3 the top and bottom runs of the V-belt 67 extend about vertically spaced pulleys 69, rotatably journalled on vertical shafts 70 and supported at their opposite ends on brackets 71, projecting outwardly of the standards 20 and suitably secured thereto. The belt 67 then turns about a drive pulley 72, keyed or otherwise secured to a transverse shaft 73. The shaft 73 extends across the machine and is shown as being driven from a parallel shaft 74, journalled in a bearing support bracket 75 mounted in the outboard frame structure 22, through a chain and sprocket drive 76. The chain and sprocket drive 76 is turn is driven from a motor 77 suitably mounted on the outboard support structure 22, through a V-belt drive 79. It will be noted that the roll 47 (FIGURE 4) is mounted on the shaft 73 and driven therefrom and that a pulley 80 is also mounted on said shaft and driven therefrom. The pulley 80 drives the rearwardly spaced roll 41 and the conveyor belts 39 through a pulley 82 and a V-belt drive 83 (FIGURE 7).

Air pressure means is provided to direct air onto the articles of flatwork laterally in opposite directions from the center thereof and further remove wrinkles from the articles and maintain the articles straight and in alignment for delivery to the ironer conveyor 15. This means comprises a centrifugal blower 99 driven from a directly connected motor 100. The blower and motor are suitably mounted on a platform structure 101 extending horizontally rearwardly of the central portion 59 of the beam 57. A duct 103 extends along the platform structure 101, rearwardly of the beam 57 along the center of the machine and has communication with a transverse duct 105 extending laterally in opposite directions from the center of the machine. Depending ducts 107 are connected to the bottom of the duct 105 and are spaced along the duct 105 equal distances apart from opposite sides of the center of the machine. The depending ducts 107 terminate into laterally outwardly directed nozzles 109 directing streams of high pressure air downwardly onto the article of flatwork and laterally therefrom in opposite directions from the center of the machine. These streams of air directed on the articles of flatwork travelling along the delivery conveyor 25 further remove wrinkles from the flatwork and hold the flatwork firmly in place on the delivery conveyor as it is released from the gripper belt 29.

A means is provided, which cooperates with the ironer conveyor 15 for stretching the sheet as delivered to the ironer. This means, as shown in FIGURES 1, 4 and 10, comprises a stretch roll 111 spaced closely adjacent the discharge end of the delivery conveyor 25, and extending across the delivery conveyor and rotatably driven by the conveyor belts 39. The roll 111 holds the sheet down as delivered to the faster travelling ironer machine conveyor 15, and cooperates with spaced stretch rolls 115 and 116 extending across the ironer conveyor and having frictional engagement with the belts 43 of the ironer conveyor and driven by said conveyor belts to stretch and straighten the article as delivered to the ironer conveyor.

The stretch roll 111 thus defines a pressure nip with the delivery conveyor, further straightening the article of flatwork as it passes in this pressure nip, and delivering the article to the faster travelling ironer conveyor in the pressure nip between the roll 115 and the belts of said ironer conveyor. The stretch rolls 115 and 116, driven by the canvas belts 43 of the ironer conveyor 15 at a higher linear speed than the linear speed of the stretch roll 111, will thus draw the article of flatwork from the delivery conveyor and stretch the article as delivered to the ironer conveyor. This will assure the delivery to the ironer of a flat squared article relatively free from wrinkles in position to be ironed.

In operation of the feeder and spreader the article of flatwork is drawn by the operator of the machine over the rail 27 until the center of the article comes into the nip between the gripper belts 23 and 29. The operator continues to hold the article with the hands moving along opposite sides of the rail 27, free from the feeder conveyor, until the hands engage the hand stops 30, 30. The article may then be released and the balance of the spreading and stretching operation may be performed by machine.

As the hands release the article, it has passed between the bottom and top tensioning belts 33 and 35 drawing the article upwardly, the faster travelling upper belts 35 effecting a side spreading or tensioning operation on the article in cooperation with the spreader belts 36, 36, spreading the article as it is drawin therealong. This in addition to the drawing of the article upwardly over the sides of the lower tensioning belts 33, 33, drawing the article laterally outwardly from the center tensioning belt, will assure a flat article of flatwork relatively free from wrinkles, as delivered in the delivery conveyor 25.

As the article is delivered onto the delivery conveyor 25 and travels downwardly therealong to the stretch roll 111, blasts of high pressure air from the nozzles 109, 109 directed in opposite directions from the center of the article will further remove wrinkles and rolls in the article, and assure a flat, squared article free from curling, as it passes into the nip between the first tensioning roll 111 and the delivery conveyor 25. The faster rotating stretch rolls 115 and 116 and ironer conveyor 15 will then stretch the article as delivered to the ironer conveyor and will further assure the delivery to the ironer of a squared article of flatwork substantially free from wrinkles and in condition for ironing.

It is customary in the art for the ironer (not shown) and the ironer conveyor 15 to be operable at different speeds for flexibility in their operation. Therefore, I have provided the motor 77 to be a variable speed motor so that spreader 21 may be synchronized with the ironer and, therefore, the combination maintains the flexibility built into the ironer itself.

As a typical example of the speeds at which the different belts operate, an example will be given wherein the speed of the motor 77 is set that the belt 23 moves at a rate of 97 feet per minute (f.p.m.). Inasmuch as the belt 29 is driven by frictional contact with the belt 23 (or the flatwork therebetween), the belt 29 will likewise run at a speed of 97 f.p.m. The belts 36 will have a speed so that the component of their movement, which is parallel to belt 23, will be about 104 f.p.m. The actual speed of the belts 36 will be somewhat greater than 104 f.p.m. inasmuch as they diverge outward; however, it is important that the component of their forward travel, which is parallel to belt 23, be slightly greater than the speed of the belt 23. The drive roller 37 has an enlarged portion or pulley over which the oblique tensioning belt 33 travels. For example, if the drive roller is two (2) inches in diameter, the pulley is 2½ inches in diameter; therefore, the speed of the oblique tensioning belt is 25% greater than the speed of the conveyor belts 36. Expressed otherwise, the component of the speed of the oblique tensioning belts 33 parallel to the belt 23 would be about 130 f.p.m.

The hold down belts 35 are driven at a speed which is at least twice the speed of the feeder conveyor belt 23. The exact speed of the belts 35 is not critical provided that they are within this range of greater speed. I have found that a speed of 200 f.p.m. works well with the feeder belt 23 traveling at the 97 f.p.m. Also, it is noted that there is not a pressure nip between the hold down belt 35 and the oblique tensioning belts 33. The belt 35 is mounted so that there is a slight vertical clearance in the order of ¼ inch or less between the belt 35 and the belt 33. Although there is no actual contact between the belts, if there are any folds or wrinkles in the flatwork, this will be sufficient so that the flatwork contacts the upper hold down belt 35 and is brushed or swept forward thereby. It will be noted that the belt 23 has considerable drag thereon and, therefore, it is driven both by the drive roller 41 and drive roller 47.

I claim as my invention:

1. An apparatus for spreading and delivering flat laundered articles for ironing and like operations comprising:

a central conveyor belt driven by power and having a top conveying run traveling along the center of the apparatus toward the rear end thereof, oblique spreader means extending obliquely of opposite sides of said central conveyor belt, a gripper belt disposed above said conveyor belt and driven by the frictional resistance between said gripper belt and conveyor belt and establishing a flatwork pressure gripping nip between said gripper belt and said conveyor belt cooperating with said spreader means to effect spreading of the flatwork as gripped and conveyed by said gripper belt and conveyor belt, at least two endless tensioning belts extending from opposite sides of the receiving end of said central conveyor belt and said gripper belt, at equal oblique angles with respect thereto and driven to travel in the same general direction as said conveyor belt, and cooperating top endless tensioning belts disposed above and in alignment with said obliquely extending tensioning belts and extending for substantially the length thereof and driven at a higher rate of speed than the speed of travel of said endless tensioning belts and contacting the laundered article to hold the article down and cooperating in the spreading of the article outwardly from its center.

2. An apparatus for speading and delivering flat laundered articles for ironing and like operations comprising:

a central conveyor belt driven by power, a gripper belt disposed above said conveyor belt and driven by the frictional resistance between said belts and establishing a flatwork pressure gripping nip between said belts, oblique spreader means comprising, a series of parallel power driven endless spreader belts extending obliquely from opposite sides of said central conveyor belt for substantially the length thereof and driven by power to travel toward the discharge end of said central conveyor belt at a higher rate of speed than the speed of travel of said central conveyor belt, endless tension belts extending along the outermost of said spreader belts in parallel relation with respect thereto, and upper aligned parallel tensioning belts extending above and along said first mentioned tensioning belts and engaging the top of the flatwork and cooperating with the lower tensioning belts to tension the flatwork outwardly from said central conveyor belt and gripper belt.

3. The structure of claim 2, wherein the flatwork tensioning belts disposed above and extending along the lower tensioning belts are driven at a higher rate of speed than the speed of travel of said lower tensioning belts.

4. The structure of claim 2, wherein spaced air nozzles are disposed beyond the discharge ends of said spreader belts and are spaced across the paths of travel of the flatwork and are directed to impinge jets of air on the articles of flatwork passing thereunder, directed laterally in opposite directions from the center of the flatwork.

5. The structure of claim 2, wherein a plurality of laterally spaced parallel delivery belts are disposed on opposite sides of said central conveyor belt and form continuations of said spreader belts.

6. The structure of claim 5, wherein an ironer conveyor forms a continuation of said delivery belts and is driven at a higher linear speed than the speed of travel of the delivery belts, and wherein longitudinally spaced flatwork stretch rolls extend across the discharge end of said delivery conveyor belts and across the receiving end of said ironer conveyor, to retain the flatwork to said conveyor and stretch the flatwork longitudinally as deposited onto and travelling along said ironer conveyor.

7. The structure of claim 6, wherein the ironer conveyor is driven at a higher rate of speed than said delivery conveyor belts, and wherein said stretch rolls disposed above the ironer conveyor engage and are driven by the ironer conveyor at substantially the same linear speed as the speed of travel of said ironer conveyor.

8. The structure of claim 7, wherein nozzles are spaced above and extend transversely of said delivery conveyor and are directed in opposite directions on opposite sides of the center of said flatwork supporting conveyor and direct air onto the flatwork laterally in opposite direction from the center thereof, for removing wrinkles therefrom.

9. The structure of claim 8, wherein the endless spreader belts are driven at a higher rate of speed than the speed of travel of the flatwork supporting and gripper belts, wherein the delivery belts are driven at substantially the same rate of speed as the central conveyor and gripper belts, and wherein the ironer conveyor is driven at a higher rate of speed than the speed of travel of the delivery belts.

10. The structure of claim 9, wherein the upper outer oblique tensioning belts are driven at a substantially higher rate of speed than speed of travel of the cooperating lower outer tensioning belts.

11. In a spreader and feeder for flat laundered articles and the like, a frame, a central conveyor extending longitudinally along said frame, an endless gripper belt disposed above said central conveyor and engaged therewith to establish a gripping pressure nip therebetween, a spreader rail in advance of said central conveyor in substantially the plane of the nip between said conveyor and said gripper belt, said spreader rail extending along opposite sides of said flat central conveyor and said gripper belt and forming a guide for the sheet as drawn upwardly therealong into the nip between said belts, at least two oblique tensioning conveyors diverging from opposite sides of said central conveyor and said gripper belt, adjacent the receiving ends thereof and in opposite directions at equal angles with respect to said central conveyor and gripper belt, and tensioning conveyors disposed above and in alignment with said oblique tensioning conveyors and driven at a substantially higher rate of speed than the speed of said oblique conveyors and brushing the sheet outwardly as it passes therealong.

12. The structure of claim 11, wherein a plurality of parallel spreader conveyors are disposed inwardly of said oblique tensioning conveyors and extend along said flatwork supporting conveyor for a greater portion of the length thereof.

13. The structure of claim 12, wherein delivery conveyors extending parallel to said sheet supporting conveyor form longitudinal continuations of said spreader conveyors.

14. The structure of claim 13, wherein a series of nozzles are spaced above and across said delivery conveyors and direct jets of air onto the flatwork travelling therealong, outwardly in opposite directions from the center of the flatwork.

15. The structure of claim 13, wherein ironer conveyors form a continuation of said delivery conveyor and are driven at a higher rate of speed than the speed of said delivery conveyor, and wherein stretch rolls extend across said delivery conveyor and said ironer conveyor and are driven at the peripheral speed of said ironer conveyor to stretch the flatwork as delivered thereonto.

16. The structure of claim 15, wherein nozzles are spaced above and extend across said delivery conveyor and are directed outwardly from the center of the sheet in opposite directions, for directing jets of high velocity air onto the sheet outwardly in opposite directions from the center thereof.

17. The method of spreading flatwork preparatory to ironing, comprising the steps of:

gripping the flatwork along the center thereof, moving the gripped flatwork toward the ironer, spreading the flatwork outward and forward along opposite sides of the center grip by lightly brushing the flatwork outwardly from its center in opposite directions throughout its entire area from below the flatwork and lightly brushing the flatwork from above in opposite directions from its center.

18. The invention as defined in claim 17, wherein the step of lightly brushing the flatwork from below is accomplished by supporting the flatwork upon surfaces which move outward and forward.

19. The invention as defined in claim 17, wherein the outward spreading is also accomplished by jetting air outward along the flatwork from above.

References Cited

UNITED STATES PATENTS

| | | | |
|---|---|---|---|
| 1,912,466 | 6/1933 | Remington | 38—143 X |
| 2,624,138 | 1/1953 | Taylor | 38—143 |
| 2,635,370 | 4/1953 | Mann et al. | 38—143 |
| 2,654,969 | 10/1953 | Woodward | 38—143 |
| 3,153,291 | 10/1964 | Buss | 38—143 |
| 3,198,516 | 8/1965 | Withorn et al. | 271—45 |
| 3,228,127 | 1/1966 | Roiland | 38—143 |
| 3,237,752 | 3/1966 | Roiland | 38—2 X |

MERVIN STEIN, Primary Examiner

G. V. LARKIN, Assistant Examiner